No. 745,319. PATENTED DEC. 1, 1903.
C. M. BREEN.
TEST TRAP OR SEAL.
APPLICATION FILED OCT. 9, 1902.
NO MODEL.
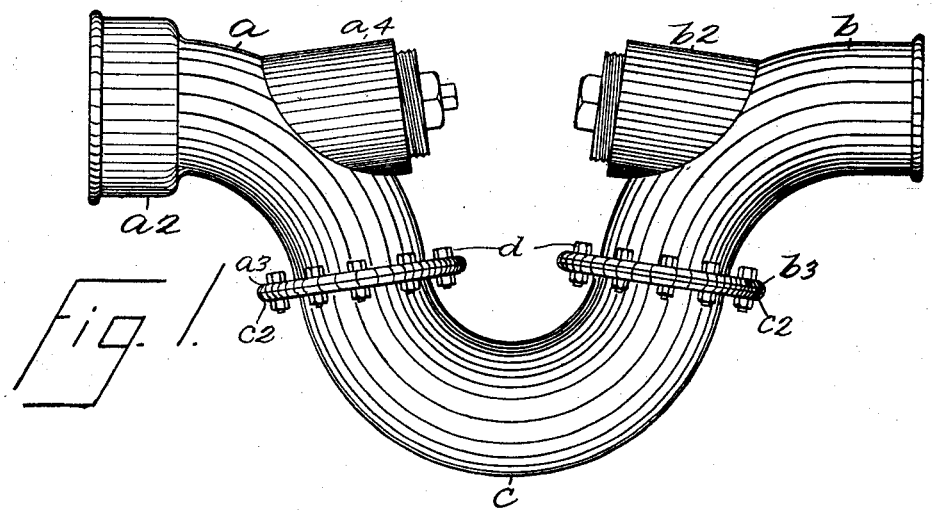
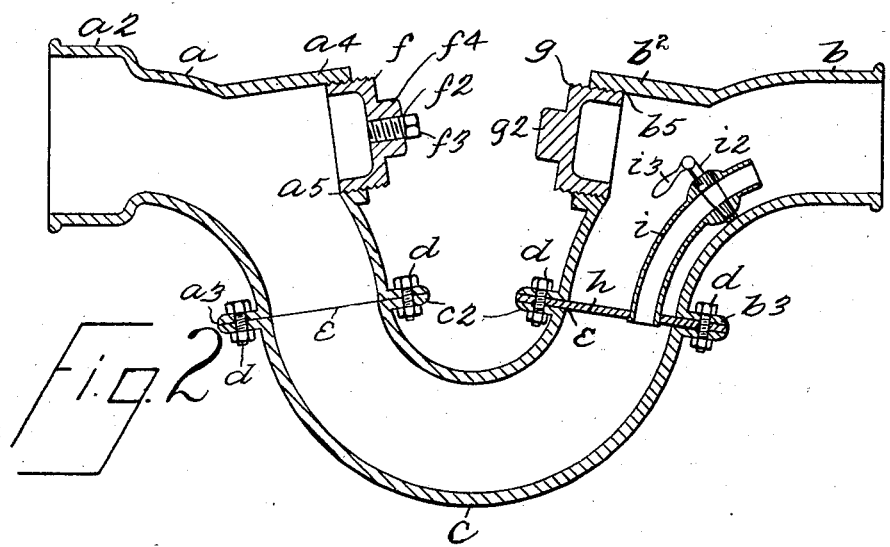
WITNESSES
J. C. Larsen
F. A. Stewart
INVENTOR
Cornelius M. Breen
BY
Edgar Late & Co.
ATTORNEYS No. 745,319.

Patented December 1, 1903.

UNITED STATES PATENT OFFICE.

CORNELIUS M. BREEN, OF NEW YORK, N. Y., ASSIGNOR OF ONE-HALF TO WILLIAM F. PRENDERGAST, OF NEW YORK, N. Y.

TEST-TRAP OR SEAL.

SPECIFICATION forming part of Letters Patent No. 745,319, dated December 1, 1903.

Application filed October 9, 1902. Serial No. 126,420. (No model.)

*To all whom it may concern:*

Be it known that I, CORNELIUS M. BREEN, a citizen of the United States, residing at New York city, in the county of New York and State of New York, have invented certain new and useful Improvements in Test-Traps or Seals, of which the following is a full and complete specification, such as will enable those skilled in the art to which it appertains to make and use the same.

The object of this invention is to provide an improved test-trap or seal for sewer-pipes or house-drains of houses whereby the plumbing of the house may be conveniently and safely tested at any time, and which will also act as a perfect drain-trap or seal; and with these and other objects in view the invention consists in a test-trap or seal of the class specified constructed as hereinafter described and claimed.

The invention is fully disclosed in the following specification, of which the accompanying drawings form a part, in which the separate parts of my improvement are designated by suitable reference characters in each of the views, and in which—

Figure 1 is a side view of my improved test-trap or seal, and Fig. 2 a longitudinal section thereof.

In the practice of my invention I provide a test-trap or seal, which is of the U-shaped style in form and is provided with opposite side branches or tubular extensions $a$ and $b$, which project in substantially the same horizontal plane, and the side branch or extension $a$ is designed to form a connection for the water-pipes, leader-pipes, or drain-pipes of a house, while the branch or extension $b$ is designed to form a connection with a sewer in the usual manner. The side branch or extension $a$ is also provided with the usual hub end $a^2$, into which the end of the main water-pipe, leader, or drain-pipe of a building may be fitted, while the side branch or extension $b$ is of the usual spigot form and adapted to fit into the hub end of a section of a sewer connection.

The bottom portion $c$ of the trap or seal is detachable and is provided at each end with an angular flange or rim $c^2$, while the lower ends of the parts $a$ and $b$ are provided with corresponding flanges or rims $a^3$ and $b^3$, whereby the separate parts of the trap may be securely connected by means of bolts, clamps, or in any desired manner, and for this purpose I have shown in the drawings ordinary bolts $d$.

The transverse cuts or divisions $e$, whereby the bottom portion $c$ is formed separately from the upper side branches of the trap or seal, as shown in the drawings, are arranged at a slight downward and outward inclination; but this feature is immaterial for the purpose of my invention, and said transverse cuts or lines of division may be both in the same horizontal plane, and this construction may be such that the bottom portion $c$ and one of the side branches of the trap may be turned at any desired angle to the other part, as will be readily understood, the object of this arrangement being to provide means whereby the separate parts of the trap or the opposite sides thereof may be arranged at any desired angle one to the other.

The side extension or part $a$ of the trap which serves as a connection for the house-pipes is provided at the upper side of the elbow curves thereof with an inwardly-directed tubular casing or shoulder $a^4$, forming a hand-hole $a^5$, which is closed by a cylindrical screw-threaded plug $f$, which is provided centrally with a supplemental opening $f^2$, which is closed by a supplemental screw-threaded plug $f^3$.

The side extension $b$ of the trap, which serves as a connection for the sewer-pipe, is also provided at the elbow curve thereof with an inwardly-directed tubular casing or shoulder $b^2$, forming a hand-hole $b^5$, which is closed by a cylindrical screw-threaded plug $g$, and the plugs $f$ and $g$ are provided, respectively, with angular or nut-shaped members $f^4$ and $g^2$, whereby a wrench may be applied thereto and by means of which said plugs may be screwed into position or removed when desired.

It is a well-known fact that it is necessary and customary at times to test the plumbing or water-pipes and vent-pipes, &c., of a house, and at the same time to prevent the escape of water therefrom during the test and also the escape of gases from the sewer, and for this purpose I place in or at the point where the bottom portion c of the trap or seal is connected with the side part b, which forms the sewer connection, a metal diaphragm or partition h, which may be composed of any preferred material, preferably lead, and secured in this plate or partition is a stop-cock comprising a tube i, open at both ends and provided with a valve $i^2$, having a handle $i^3$, whereby said valve may be operated by removing the plug g, and the open end of the stop-cock or the tube i thereof projects into the side member b, which forms the sewer connection. In order to place the partition-plate h in position, the bottom part c is removed and said partition-plate is bolted or otherwise secured between the adjacent ends of the parts c and b of the trap, and in order to remove said partition-plate this operation must be reversed. It will be understood that in the normal condition of the trap the plate h is removed, and the trap operates in this respect as an ordinary trap; but when it is desired to test the plumbing of the house or to perform any similar operation the partition-plate h is secured in position, as shown in Fig. 2.

Whenever it is desired to make the test above referred to, the bottom portion c of the trap is removed, the partition-plate h, with the stop-cock i, is inserted, and the bottom part c of the trap is again secured in place, and when this is done the supplemental plug $f^3$ in the plug f is removed and a test-pipe is screwed onto the plug f, and the plumbing or drain-pipes of the house may be fully tested with water which is introduced from the water-supply pipe connected with the plug f, and no gas can escape from the sewer. After the test has been made the plug g is taken out, the stop-cock is opened, and the plug g is again inserted, and the test-water will flow back through the trap into the sewer, after which the bottom of the trap is again detached, the partition-plate h is removed, and the separate parts of the trap are again connected, and said trap is ready for use for the ordinary purpose of a trap or seal of this class.

The trap is so constructed that the water when the trap is in use is always above the points of connection between the bottom portion c and the side branches a and b, which are made gas and water tight, and by forming the plug f as described a test-pipe may be connected therewith and used by simply removing the supplemental plug $f^3$. The plug f may also be removed for the purpose of removing any matter—such as brick, metal, pieces of tin, or any other substances which may fall into the trap through carlessness in plumbing or repairing the plumbing—and the plug g may be removed whenever desired, so as to give a clear view into the sewer or house-drain, and it is to facilitate this operation that the hand-holes $b^5$ and $a^5$ and the tubular casings or shoulders $b^2$ and $a^4$, forming said hand-holes, are directed inwardly or substantially inwardly. As shown in the drawings, this part has a slight upward inclination, but by removing the plugs g and f a clear view is afforded through the parts b and a of the trap and also into their connections.

Having fully described my invention, what I claim as new, and desire to secure by Letters Patent, is—

1. A U-shaped test-trap or seal, the sides of which are directed outwardly and provided at the top thereof with inwardly-directed tubular extensions which are closed by screw-threaded plugs, one of said plugs being provided with a central opening which is closed by a supplemental plug, the bottom portion of the trap being detachable, and a diaphragm adapted to be secured in one side of the trap and being provided with a stop-cock which extends into said side when said diaphragm is in position, said diaphragm being adapted to be secured in position by securing the bottom of the trap, substantially as shown and described.

2. A U-shaped test-trap or seal the bottom of which is removable, and a partition-plate adapted to be inserted between the bottom portion and one side of the trap or seal, said partition-plate being provided with a stop-cock and said side of the trap or seal with an opening affording access to said stop-cock, substantially as shown and described.

In testimony that I claim the foregoing as my invention I have signed my name, in presence of the subscribing witnesses, this 7th day of October, 1902.

CORNELIUS M. BREEN.

Witnesses:
GEO. H. CONGER,
CHARLES WM. MCDONALD.